R. R. WHITING.
VIEW EXHIBITING APPARATUS.
APPLICATION FILED MAR. 16, 1908.
963,841.
Patented July 12, 1910.
2 SHEETS—SHEET 1.
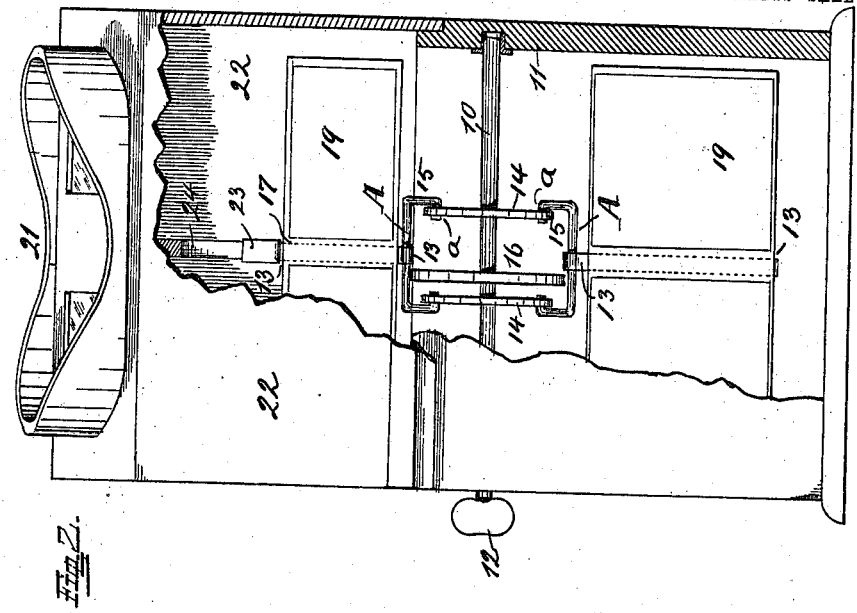
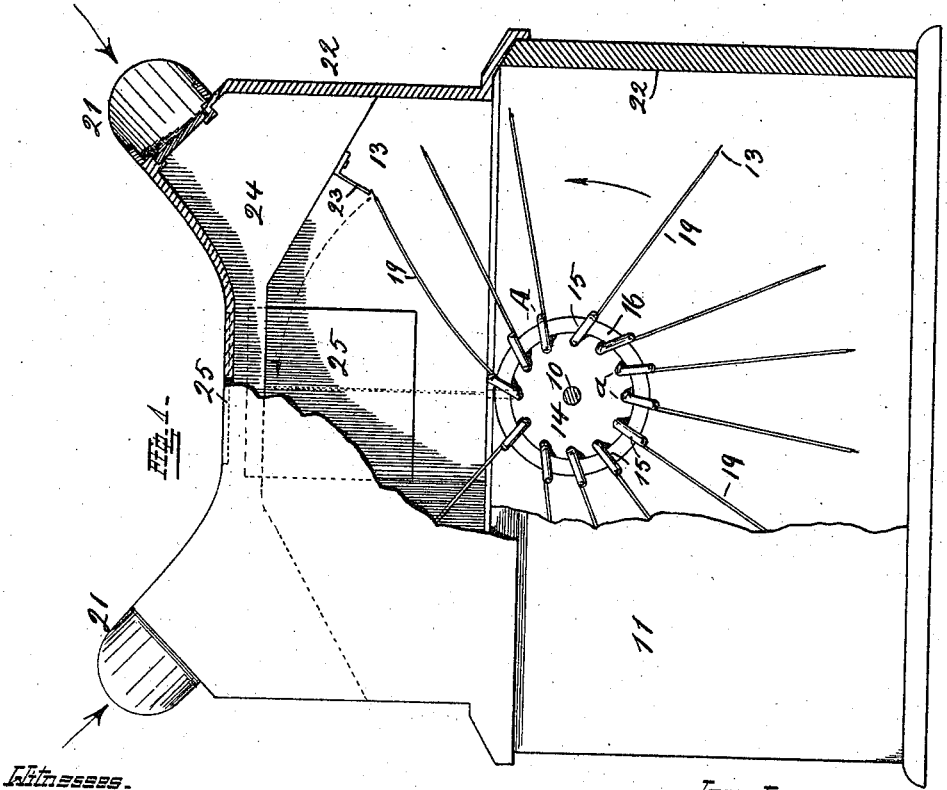
Witnesses
Alphonse Rigg
F. LeBeau
Inventor
Richard R. Whiting
by C. Spengel Atty

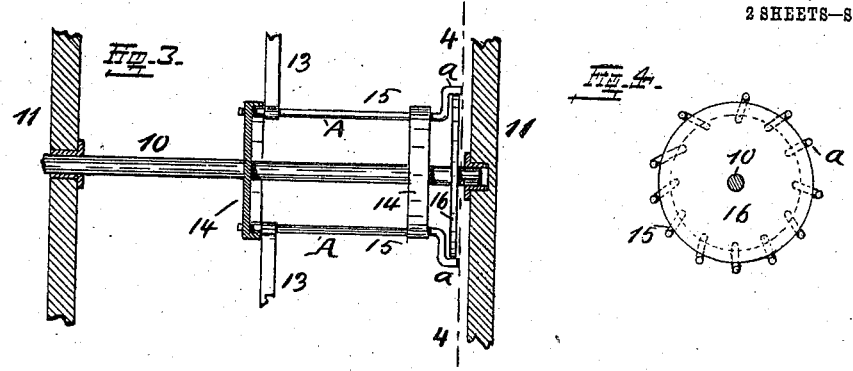
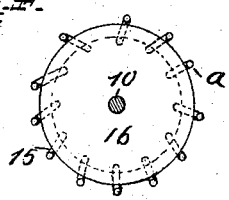
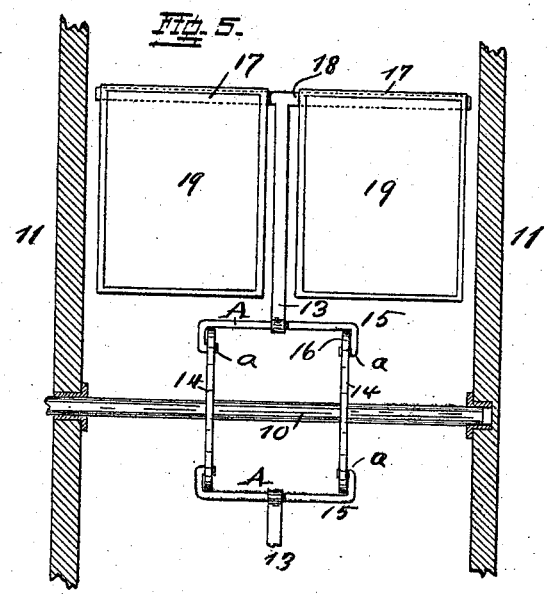
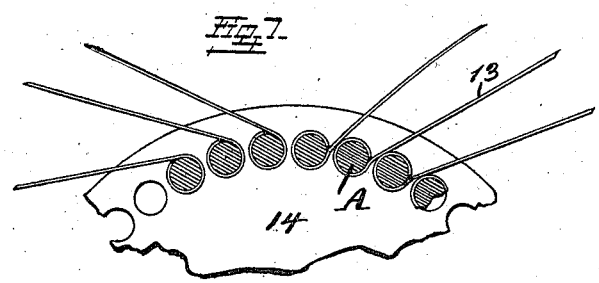

UNITED STATES PATENT OFFICE.

RICHARD R. WHITING, OF NORWOOD, OHIO.

VIEW-EXHIBITING APPARATUS.

963,841. Specification of Letters Patent. Patented July 12, 1910.

Application filed March 16, 1908. Serial No. 421,531.

*To all whom it may concern:*

Be it known that I, RICHARD R. WHITING, a citizen of the United States, and residing at Norwood, Hamilton county, State of Ohio, have invented certain new and useful Improvements in View-Exhibiting Apparatuses; and I do declare the following to be a clear, full, and exact description of the invention, attention being called to the accompanying two sheets of drawings, with the reference characters marked thereon, which form also a part of this specification.

This invention relates to certain new and useful improvements in view exhibiting devices of the kind where pictures, usually stereoscopic views, are shown through view-glasses.

The invention concerns particular means and devices whereby a set or series of such pictures is supported and moved in a manner that one after the other of them appears in position convenient for viewing.

The invention concerns also means whereby each one of the pictures of a set is connected to the general supporting devices. The views are each prepared in a manner complementary to these particular supporting means.

A feature of the invention is the particular arrangement of the operating devices as well as of the views which permits the apparatus to be used by two persons at the same time.

In the following specification and particularly pointed out in the claims at the end thereof, will be found a full description of my invention, together with its operation, parts and construction, which latter is also illustrated in the accompanying two sheets of drawings, in which:—

Figure 1, shows the apparatus partly in side-elevation and partly in cross-section. Fig. 2, is a front-view of the apparatus partly in section. Fig. 3, in part of a view similar to Fig. 2, shows a modified construction. Fig. 4, is a vertical section on line 4—4 of Fig. 3. Fig. 5, in a view similar to Fig. 3, shows another modification. Fig. 6, is an enlarged edge-view of a part of this view. Fig. 7, shows at enlarged scale in a sectional view certain details of construction.

A shaft 10 supported at opposite ends in opposite sides 11, 11 of a suitable box, constitutes the means whereby a set of views are supported. Power applied to this shaft, either manually or by means of a suitable mechanism, serves to rotate the same at a speed appropriate for the purpose. In this case one end of this shaft extends through the side of the box and a handle 12 is provided at the projecting end for manual operation. A number of slender arms 13 are provided on the shaft from which they project, substantially radially, their connection however being neither a direct nor a rigid one, but so as to give each arm a certain limited amount of motion independent of the shaft and in a peripheral direction, that is in the plane in which they are carried around by the shaft. This function arises from the particular construction of intermediate means whereby these arms are connected to shaft 10. These means consist substantially of a hub mounted upon shaft 10 and of hinges provided on the periphery of this hub, one for each arm 13. The hub consists of two disks 14, 14 spaced apart as shown and rigidly mounted upon shaft 10. The hinges indicated at 15 consist preferably of wire-rods which are shaped to form parallel members A and *a*, connected and spaced apart by intermediate parts of the rod. To the longer member A of these hinges are secured the inner ends of arms 13, preferably as shown in Fig. 7, these ends being curled around the rod and rigidly connected, by solder for instance. These hinges are carried by the hub mounted upon shaft 10, being connected to disks 14, 14 which constitute this hub, their connection to these disks being at or near their edges and is a pivotal or hinged one. It is by this particular manner of attachment to the disks that the function of a hinged connection is imparted to arms 13 and this result may be obtained by the connection of either of the two parallel parts A or *a* of the hinges 15 to these disks. Thus for instance in Figs. 1 and 2 the connection is by the shorter parts *a*, *a'* which are loosely mounted in oppositely located openings in disks 14.

In Figs. 3 and 4 the position of the hinges on the hub is reversed and they are mounted in disks 14 by their longer part A which is nearest shaft 10. It will be perceived now that this manner of connection permits arms 13 to swing with reference to shaft 10 and independent of this latter, the pivot for this motion being constituted by hinges 15 and more particularly by that particular one of their parallel parts which is mounted on disks 14 and also nearest to shaft 10. Thus as shown in Figs. 1, 2, and 5, the short parts *a a* constitute the pivots for this motion. In Fig. 3, the ends of the longer part A constitute these pivots. In either case, the other parallel part of these hinges farthest from shaft 10, serves in conjunction with an additional member as a means to limit this independent motion of arms 13, so that after this movement is exhausted, said arms follow the shaft 10 and are positively moved by it. This additional member consists of a disk 16, rigidly mounted upon shaft 10. As shown in Fig. 2 this disk is mounted between disks 14. As shown in Fig. 3 it is mounted outside of these disks, but in each case its peripheral edge is inside of and below the outer one of the parallel parts of the hinges and with a space between it and these parts. In each case the size of this space determines the extent of the independent movement of arms 13 on shaft 10, and this movement is limited and terminates at once by contact of this particular hinge-part with the edge of disk 16, this latter forming a positive stop. In Fig. 5, this arrangement is modified by the omission of a separate disk 16, and in place of which disks 14 are each diametrically enlarged so that their edges constitute this stop and operate in conjunction with the outer parts of the hinges the same as disk 16 would otherwise do. In Fig. 3, disks 14 are also slightly modified by being provided with flanges at their edges.

The views are provided with a sheath or pocket 17 closely fitted to receive arms 13 and whereby, when slipped upon these arms, the views are held in place. These pockets are formed by pasting a strip of suitable material, paper or fabric, upon the back of a picture. By preference I use two pictures, which are secured to each other, back to back, one being mounted upon the other one, adhesive means being applied between them.

A strip of a width and length sufficient to receive arms 13 is left disconnected to form pocket 17 before alluded to (see Fig. 6). These pockets may be formed between the edges of a view as shown in Fig. 2, or near or at one edge as shown in Figs. 5 and 6. In this latter case arms 13 are provided with lateral extensions 18 upon which the views are slipped. This arrangement of the views results in a card 19, which has two pictures, one on each one of its sides and whereby the view or picture capacity in a given apparatus is doubled, since two pictures are provided in a space which otherwise would be occupied by one only. At the same time the views are supported in a practical manner which permits convenient exchange, removal or attachment. The pictures may of course be exposed to view direct and without the intervention of any view-glasses. I prefer however to show them through glasses which may be stereoscopes as shown at 21. These glasses are mounted at the upper part of the sides 22 of the box, there being two of them, positioned opposite each other to direct vision inwardly and downwardly.

23 is a stop so located as to intercept the cards when they are moved by rotation of shaft 10. The engagement is with the extreme end of arms 13 and is only a limited one, the object being to retard the cards temporarily to permit observation of the picture on one side thereof which picture may be viewed through one set of the view-glasses, those on the left, with reference to Fig. 1.

The uninterrupted motion of shaft 10, acting by means of disk 16 upon the hinge-members, sets up a spring-action with respect to arms 13, whereby, as soon as the end of an arm 13, has slipped out from under stop 23 and become free, the particular arm together with a card carried on it, is at once thrown over to the opposite side (see dotted lines in Fig. 1) until the outer part of the hinge of this arm comes again in contact with the edge of stop-disk 16. The arm after its forcible release occupies now an angular position similar to the one it occupied before but on the opposite side and the picture on the other side of the card on this arm may now be seen through the other view-glasses. It will now be understood that first the picture on one side of a card 19 is viewed through one of the glasses, after which the picture on the other side of the same card is viewed through the other glass, there being always a picture in position for viewing under each one of the view-glasses. Two persons may therefore use the apparatus at the same time. The space below these glasses and between them is always clear because each card after its forcible release from stop 23 flops clear over to the other side. The spring-action before alluded to may be due to the material of which arms 13 are made, which material may be resilient metal. It may also be due to the torsional strain set up in that part of the hinge-member to which arms 13 are rigidly connected. It may also be due more or less to the joint action of these agencies.

Stop 23 may be secured to any available part within the box. It is secured here to the usual division or septum 24 which divides the stereoscope inside and which in this case is sufficiently extended for the purpose.

Light may be admitted through glass-panels 25 in top, or sides or both.

In Figs. 1 and 4, the hinges and the arms on them are shown with considerable space between them, and in Figs. 2, 3 and 5, only those arms which occupy extreme positions are shown and all intermediate ones are omitted to render the drawings clearer. In reality these hinges and arms are contemplated to be much closer together and about as indicated in Fig. 7.

Having described my invention, I claim as new:

1. In a view-exhibiting apparatus, the combination of a shaft, yieldingly attached arms carried thereby and each adapted to support two views arranged back to back, means to rotate this shaft with the arms, a stop located in the path of these arms adapted to temporarily retard them one after the other to hold one of the views carried thereby in position for viewing a view-glass through which this view may be observed and an additional view-glass to observe the other view on this arm after this latter has been released from the stop.

2. In a view-exhibiting apparatus, the combination of a shaft, means to rotate it, arms of elastic material adapted to interchangeably support pictures hinged to it there being an arm for each picture, and a rigidly connected stop located in the path of these arms and adapted to engage them temporarily in a manner to produce a spring-resisted retardation in the arms whereby a retarded arm, after released by reason of the movement of the shaft, is caused to move out of position, independent of the motion derived from the shaft, to expose a picture carried on the arm following it.

3. In a view-exhibiting apparatus, the combination of a shaft, means to rotate it, a hub on it and arms of elastic material adapted to support views yieldingly connected to this hub in a manner to be capable of a limited, independent movement with reference to the shaft so that one picture after viewed may move out of position to expose the one following it, independent of the motion derived from the shaft.

4. In a view-exhibiting apparatus, the combination of a shaft arranged to be rotated, a hub on it, arms adapted to support views, a hinge for each arm consisting of two spaced, parallel members A, a, to one of which the end of an arm is rigidly attached, while by means of its other member each hinge is pivotally mounted upon the hub and whereby these arms become capable of a certain movement independent of the shaft and means adapted to co-act with and engage one of the hinge members to limit this movement of the arms.

5. In a view exhibiting apparatus, a series of flat arms of spring metal adapted to support views interchangeably, rotary supporting means to which each arm is rigidly attached at its inner end and all mounted for rotation, and a rigidly connected stop immovably supported in the path of the outer ends of these arms and adapted to temporarily retard them by engaging these ends.

6. In a view-exhibiting apparatus, the combination of a shaft arranged to be rotated, two disks mounted thereon with a space between them, a hinge-rod supported at its ends between these disks, flat arms of spring metal adapted to support views one rigidly attached to each of these hinge-rods and between their ends and a stop located in the path of the outer ends of these arms and adapted to temporarily engage them.

7. In a view-exhibiting apparatus, the combination of arms, views provided with pockets on their rear side fitted to receive these arms so as to support the views and means supported for rotation upon which these arms are mounted.

8. In a view-exhibiting apparatus, the combination of arms, view-cards formed by two pictures, secured back against back except where a pocket is reserved between them fitted in width to receive the arms, to support these cards and means to support these arms.

9. A new article of manufacture consisting of two sheets of paper of congruent outline, each with a picture on one side and pasted together so as to be connected to each other at their blank sides all around their edges and between them, with exception of an elongated, narrow space extending from one of the edges inwardly and where no paste is applied so as to leave a pocket which permits insertion of means for supporting the card.

In testimony whereof, I hereunto affix my signature in the presence of two witnesses.

RICHARD R. WHITING.

Witnesses:
   C. SPENGEL,
   F. LE BEAN.